E. FIXARY.
ICE-MACHINE.
No. 192,497. Patented June 26, 1877.
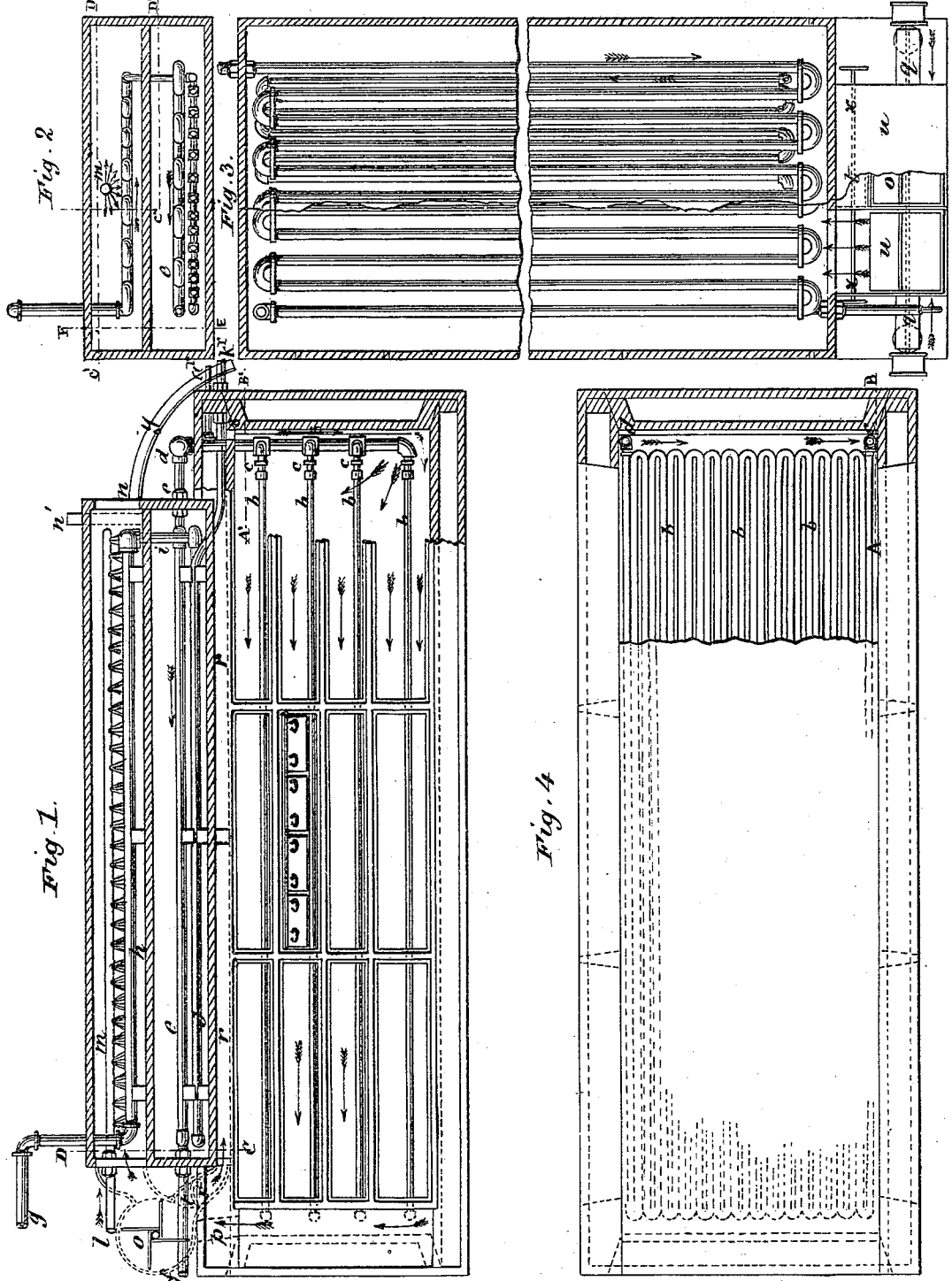

UNITED STATES PATENT OFFICE

EDWARD FIXARY, OF NEW ORLEANS, LOUISIANA, ASSIGNOR OF ONE-HALF HIS RIGHT TO ALBERT C. JANIN, OF SAME PLACE.

IMPROVEMENT IN ICE-MACHINES.

Specification forming part of Letters Patent No. 192,497, dated June 26, 1877; application filed June 5, 1877.

*To all whom it may concern:*

Be it known that I, EDWARD FIXARY, of New Orleans, in the State of Louisiana, have invented certain new and useful Improvements in Ice-Machines, of which the following is a full, clear, and exact description:

My present invention relates to apparatus for the condensation and vaporization of refrigerating bodies employed in the freezing of liquids and other substances, and to arrangement in combination therewith of air-agitating mechanism, whereby a rapid evaporation upon condensing-tubes is produced; also, to the means of creating partial vacuum in the freezing apparatus in order to facilitate the formation of ice in the same manner as that is produced in nature, so that the air contained in water may be expelled and a transparent ice obtained; and my invention consists in the means of maintaining constant circulation of air against the plates or pipes and the wall of molds containing the liquid to be frozen; also, in the means of expelling by suction air or gases contained in the liquids; also, in the means whereby any air, which may enter the ice-machine when the same is opened to remove therefrom the formed ice, may be extracted.

It will be unnecessary for me to refer to the effects of condensation and vaporization of refrigerating substances or to their physical or chemical qualities and composition, which are well known, my present invention relating simply to apparatus.

The construction of my machine may be modified without departure from my invention.

In the drawings hereunto annexed I have shown a machine which I have found in practice to answer well my purposes.

In said drawings, Figure 1 is a vertical section on lines A B E F, partly in elevation, representing my machine in all its details, consisting of the following parts: First, the condenser, which is placed in the upper trough and is subjected to constant water-jets, and ventilated in such a way as to create a prompt and efficient evaporation of the water falling on the condensing-plate; second, the liquefying-tank, which contains the water to be converted into ice; also, the refrigerating-plate, which, by the passage of gas or vapor, produces an intense cold in the tank; and the condenser, which is composed of pipes of smaller diameters, and which are surrounded by a large volume of cold water. This series of pipes is placed immediately underneath the refrigerating-plate, in such a way as to facilitate the liquefaction of the vapor or gas; third, the congealing-tank, which contains the refrigerating-plates and the ice-molds; fourth, a fan-blower, agitating the air around the condensing-plates; fifth, a blower, located upon the side of the congealing-tank, and so arranged as to draw the air from the congealing-tank and from the liquids which may contain it, to force it back to the opposite extremity, below the ice-molds, in such a way that this air cooled shall pass in contact with the refrigerating-surfaces and the molds containing the liquids; sixth, an air and gas escape-valve, whereby I am enabled to obtain a partial vacuum, and thus accelerate the freezing of as well as the extraction of the air in the liquids.

The air-agitator is mounted upon the same shaft upon which the ventilator is mounted, and the same pulley thus gives motion both to the suction and forcing apparatus as well as to the air-agitator.

Fig. 2 represents a transverse section of the condensing-trough, showing the condensing-plate with the jet-producing tube. It also shows the liquefying-tank containing the refrigerating-plate, through which the gases are returned to the pump; also, the condensing-plate, through which the refrigerating agent is forced in the condition of vapor, and liquefied before it is returned to the receptacle from which it came.

Fig. 3 represents a plan view, partly in section, through lines $C^1 D^1$ and $C^2 D^2$, showing the air-agitating apparatus in connection with the condensing-tube, and the air and gas suction and forcing apparatus, provided with a valve whereby excess of air contained in the congealing-tank is withdrawn and fresh air is caused to re-enter.

Fig. 4 is a plan view of the refrigerating-plates, partly in section, through line $A^1 B^1$, to indicate the entrance and exit of the refrigerating-gas.

Fig. 5 represents plan and end views of the ice-molds.

The course which the refrigerating agent takes may be followed by the arrow-indications in the drawing. It commences at $a^x$, which shows the pipe through which the gas is drawn by the pump to pass through the series of pipes $b\ b\ b$, which are arranged in layers in the form of plates constituting the support of the ice-molds. These pipes $b\ b\ b$ form connection with a transverse pipe at $c$, as shown in the drawing.

At $d$ the refrigerating agent issues from the refrigerating-plate to enter into the liquefying-tank by passing through the pipes $e\ e\ e$ to the pump at some point beyond $f$. The same pump which draws the gas or refrigerating agent through the pipes $a\ b\ e$ is also forcing it now through those marked $h$ in the condensing-trough, the gas entering at some point beyond $g$, which is the pipe making connection with the pump.

The gas-refrigerating agent will pass from the series of pipes $h\ h\ h$ through the branch pipe $i$ into those marked $j$, in which it is liquefied, and which pipes thus constitute the liquefying-plate. The liquefied gas will finally issue at $k^x$, to be conveyed into the receptacle of the liquid-refrigerating agent whence it is originally derived. The water-jet upon the condensing-plate is produced by a perforated pipe, $m$, and the water as well as the air is withdrawn from the upper or condensing trough at $n$. $n'$ shows the pipe through which the water enters the liquefying-tank. This same water may serve the purpose of filling the molds. $o$ in the drawings is the blower, receiving the air from the congealing-tank at $p$. $q\ q\ q$ are the air-suction tubes; $r$, the passage of the air from the blower into the congealing-tank, being a conduit arranged between the liquefying and congealing tanks. $s$ indicates the course which the air, drawn by the blower and impelled forward by the same means, pursues in entering the lower part of the congealing-tank. $t$ is the valve, which is used for the purpose of changing the direction of the air from the congealing-tank to be conveyed, if necessary, outside of the apparatus, in order to prevent too great pressure of air within the congealing-tank, and also to rarefy it as much as possible, and to return it to below the refrigerating-plates, as before explained.

$u$ is an extension of the blower, but operating independently thereof to agitate the air in the upper trough, in order to create a heavy vaporization of the water-spray upon the condensing-plates. $v\ v\ v$ are the ice-molds, and $x$ the shaft or spindle, by which the valve may be operated, as before explained.

It will be understood from the foregoing description any receptacle may be used to contain the liquid to be frozen; thus bottles or otherwise shaped vases may be placed in the congealing-tank in the same manner as the molds. But it is not necessary, and it may even be of some advantage, to place the molds or vessels containing the liquids to be frozen upon independent supports within the congealing-tank and between the refrigerating-plates, in which case advantage could be taken of the apparatus described above for the cooling of air to be used in dwellings, or for the preservation of food, or for manufacturing purposes.

Having thus described my said invention, and the manner in which the same is or may be carried into effect, what I claim, and desire to secure by Letters Patent, is—

1. The combination, in a tank, of a series of pipes arranged in tabular form, communicating with a forcing and suction pump, so as to cause the gas to be condensed to circulate therein, substantially as herein described, with a water-rose or jet-pipe extending longitudinally the whole length of said condensing-pipe, and a blower located outside but communicating with the interior of the tank, substantially as herein shown and set forth.

2. In combination with the condensing-tank, its gas-condensing pipes, water-rose, and blower, the liquefying-tank containing two series of pipes, both arranged in tabular form, but one above the other, the former being composed of larger pipes than the latter, but so communicating with the same pump as that the gas to be liquefied shall travel in the two sets of pipes in opposite directions, as herein shown and set forth.

3. The combination, with the condensing-trough and its condensing and jet pipes, and the liquefying-tank and its two sets of condensing and liquefying pipes, of the congealing-tank, containing a series of refrigerating-tubes for the support of or interposition between molds, substantially as herein shown and set forth.

4. The congealing-tank, the same consisting of a series of tables or plates composed of refrigerating-pipes, through which the refrigerating agent is caused to circulate, in combination with a ventilator and valve for withdrawing air from or both forcing the same into and from said congealing-tank, as and for the purpose set forth.

In testimony whereof I have hereunto signed my name to this specification in the presence of two subscribing witnesses.

EDWARD FIXARY.

Witnesses:
ALBERT C. JANIN,
J. G. HARA.